(12) United States Patent
Milios et al.

(10) Patent No.: US 6,687,774 B2
(45) Date of Patent: Feb. 3, 2004

(54) WIRELESS HOST WITH IMPROVED ROUSTNESS AND BOOT CAPABILITIES

(75) Inventors: Ioannis Milios, New York, NY (US); Wei Wang, Forest Hills, NY (US)

(73) Assignee: Semtech New York Corporation, New York, NY (US)

( * ) Notice: Subject to any disclaimer, the term of this patent is extended or adjusted under 35 U.S.C. 154(b) by 415 days.

(21) Appl. No.: 09/681,069

(22) Filed: Dec. 19, 2000

(65) Prior Publication Data

US 2002/0077764 A1 Jun. 20, 2002

(51) Int. Cl.⁷ .............................................. G06F 13/12
(52) U.S. Cl. .............................................. 710/72; 710/8
(58) Field of Search ................................ 710/3, 4, 8, 9, 710/19, 52, 62, 67, 65, 72, 105, 106, 313

(56) References Cited

U.S. PATENT DOCUMENTS

| | | | | |
|---|---|---|---|---|
| 5,890,015 A | * | 3/1999 | Garney et al. ................. | 710/62 |
| 5,946,469 A | * | 8/1999 | Chidester ..................... | 710/72 |
| 6,195,712 B1 | * | 2/2001 | Pawlowski et al. ........... | 710/19 |
| 6,308,227 B1 | * | 10/2001 | Kumar et al. .................. | 710/4 |
| 6,493,104 B1 | * | 12/2002 | Cromer et al. ................. | 710/62 |
| 6,519,290 B1 | * | 2/2003 | Gren .............................. | 710/9 |

* cited by examiner

Primary Examiner—Khanh Dang
(74) Attorney, Agent, or Firm—Oppedahl & Larson LLP

(57) ABSTRACT

A wireless host is used with a computer having a BIOS, an operating system, a serial bus interface coupled with the BIOS, the wireless host operating under a protocol that functions only in the presence of a corresponding wireless communications driver in the operating system, and the BIOS characterized in that human interface device information received via the serial bus interface is made available to the operating system by means other than the wireless communications driver. Human interface device information is received via the wireless host. Depending on a predetermined condition, the human interface device information is passed to a wireless communications driver in the operating system, or is passed to the serial bus interface and is made available to the operating system by means other than the wireless communications driver. The predetermined condition may be the absence of the wireless communications driver, or for example may be the determination that the human interface device information is an escape sequence. In this way, user communications to the computer can be robust even in the event of operating system or software failure.

19 Claims, 2 Drawing Sheets

WIRELESS HOST WITH IMPROVED ROUSTNESS AND BOOT CAPABILITIES

BACKGROUND OF THE INVENTION

It is not easy to provide robust and highly reliable human-interface devices such as keyboards and pointing devices if they are to be coupled with computers via wireless links.

From a historical point of view, human-interface device interfaces have been characterized as having greater and greater complexity as time has progressed. The first human-interface devices used with personal computers used fairly simple serial interfaces together with relatively simple BIOS (basic input-output system) code. The BIOS (residing in ROM) in these simple implementations was the only software needed to make the user inputs available to the system console, the operating system and to software applications. Subsequent personal computer designs such as the IBM PC. Jr. attempted to use infrared communications links, but such computers did not come to be commonly used, in part due to unreliability of the wireless links.

More recently, computer designers have made provisions for high-speed serial interfaces such as Universal Serial Bus ("USB") interfaces. Such interfaces have been shared among other devices with keyboards and pointing devices. The high speed, and the ability to interface multiple type of devices through the same connection, increases dramatically the complexity of implementation. While in the past BIOS code was sufficient to handle input from keyboards, mice and simple serial devices, today any device connected to a link such as USB requires the services of complicated OS drivers. Such approaches experience long deployment periods, partly because not all operating systems have support for USB. Users are not always happy with such devices because the USB cables are stiffer and less flexible than the cables to which users are accustomed with regard to keyboards and pointing devices such as mice, touch-pads and other rodents. One of the most important issues that designers have had to resolve in order to be able to adopt USB is the ability of USB keyboards and mice to provide input without the assistance of software drivers. This is important during the boot stage of the computer system, in order to be able to provide human input for resolving system problems in situations where the OS cannot operate. Computer designers have, however, devised BIOSes which are able to receive input from human-interface devices and which can provide the input to the operating system and to software applications.

Still more recently, system designers have attempted to provide wireless communications between computers and other devices. Wireless devices following the IEEE 802.11b standard have permitted communications at up to 11 Mbps between computers and local area networks and the Internet, though at a cost of some considerable power consumption. Still other wireless hardware following the Bluetooth specifications have permitted communications between a variety of devices including human-interface devices such as keyboards and pointing devices, along with personal computers, personal organizers, printers, cellular phones and personal area networks, all at lower power consumption than if IEEE 802.11b is followed.

Present-day wireless systems offer a substantial drawback in that considerable computational overhead is required to implement the various protocol layers defined in the specifications for the systems. There is substantial economic pressure to reduce hardware costs for the wireless systems to the lowest possible levels, in part because history has shown that among competing standards, the per-box hardware cost for implementation of the standard is one of the factors affecting the eventual widespread adoption of the standard. Such pressures prompt system designers to assume that much of the computational overhead may be offloaded to the main processor of the system and to its operating system. As a result, operating system drivers are generally required to be used in connection with the hardware and firmware of the wireless solution. Historically it has often been found that the standards and specifications for implementation of new systems represent a moving target, and this too prompts system designers to shift as much of the computational function to drivers (that is, to places other than hardware and firmware) because this makes it easier to ship product that has some possibility of continued usability even in the event of changes in the associated standards or specifications.

Many of the devices to be coupled by means of wireless links are not absolutely critical to function and control of the central device such as a computer. Loss of use of an external headset or game console, for example, could leave the keyboard functioning so as to permit a user to take steps to restore the function of the headset or game console.

There is, however, an understandable desire on the part of users to be able to shift any and all devices which were previously wired to the wireless link, and an understandable desire on the part of system designers to accommodate such users. It is thus unsurprising to see system designers attempting to provide wireless keyboards, touch pads, and mice and other rodents, all intended to communicate with a computer through its wireless interface such as a Bluetooth host interface.

It is, however, all too easy for a system designer merely to provide wireless hardware in the human interface device and to rely upon the existing wireless infrastructure, including host hardware, firmware, and operating system driver, for end-to-end connectivity between the human interface device and the operating system and application software. Such an arrangement, as will be appreciated from the foregoing and following discussion, is at risk of loss of function under any of a number of conditions including loss or corruption of wireless drivers or human interface device ("HID") related drivers, or a disk failure, and thus is not as robust as prior-art wired systems. For a system designer who has considered the points made above, there is thus a great need for a reliable and robust approach for provision of human-interface devices which are communicatively coupled to a computer by wireless means.

SUMMARY OF INVENTION

A wireless host is used with a computer having a BIOS, an operating system, a serial bus interface coupled with the BIOS, the wireless host operating under a protocol that functions only in the presence of a corresponding wireless and HID communications driver in the operating system, and the BIOS characterized in that human interface device information received via the serial bus interface can be made available to the operating system if necessary by means other than the wireless and HID communications driver. Human interface device information is received via the wireless host. Depending on a predetermined condition, the human interface device information is passed to a wireless communications driver in the operating system, or is passed to the serial bus interface and is made available to the operating system by means other than the wireless communications driver. The predetermined condition may be the absence of the wireless communications driver, or for example may be the determination that the human interface device information is an escape sequence. In this way, user communications to the computer can be robust even in the event of operating system or software failure.

BRIEF DESCRIPTION OF DRAWINGS

The invention will be described with respect to a drawing in several figures, of which.

Where possible, like elements have been shown with like reference designations.

DETAILED DESCRIPTION

Figure 1:
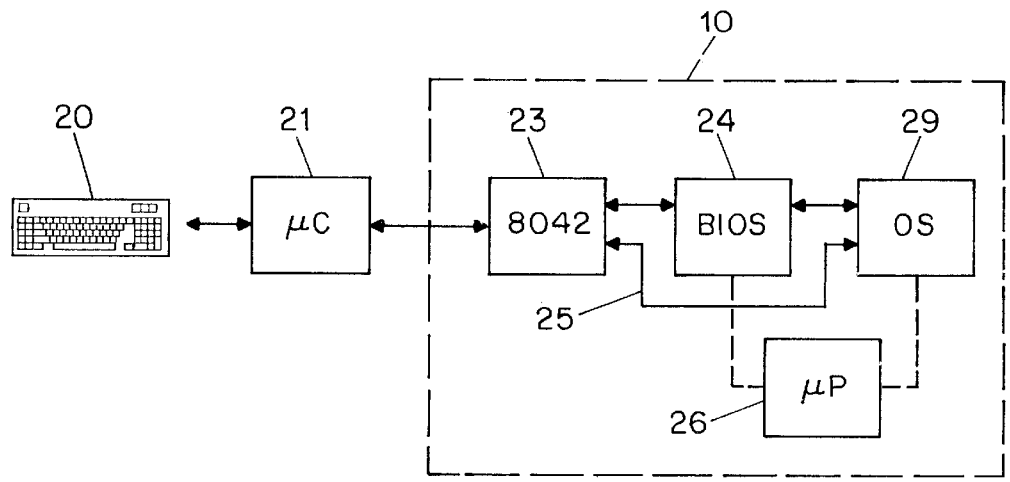
FIG. 1 is a functional block diagram of a prior-art keyboard and serial interface to a personal computer.

Turning first to FIG. 1, what is shown is a functional block diagram of a prior-art keyboard 20 and serial interface to a personal computer 10. Wired serial link 22 is a flexible cable running from the keyboard 20 to the personal computer 10, the host end of which contains an 8042 type microcontroller 23 while the keyboard end contains a generic type of microcontroller 21. The host microcontroller 23 responds to receipt of a "scancode" from the keyboard 20 by signaling the BIOS 24. The BIOS 24 makes the user input available to the operating system or application program 29. A microprocessor 26 executes the BIOS 24 and the operating system or application program 29 from time to time. The system of FIG. 1 is straightforward and widely used. It should be noted that while BIOS 24 is capable of providing keyboard input to the console, newer OSs like Windows 9x, 200x take over the direct connection to the 8042 (25) and handle directly the user interface, as soon as they are loaded. Support of keyboard input by BIOS 24 is still necessary, however, during the boot stage in order to be able to troubleshoot, or change the system setup in situations where the OS cannot operate, as for example when a disk crash occurs.

Figure 2:
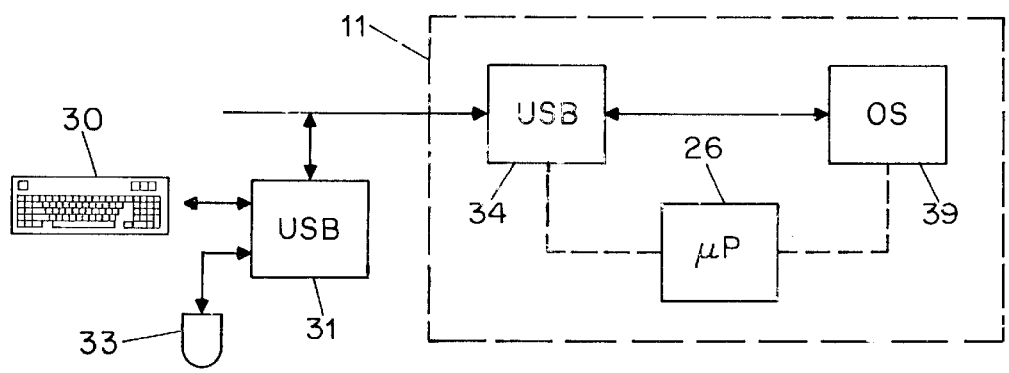
FIG. 2 is a functional block diagram of a prior-art keyboard and high-speed serial interface to a personal computer in a normal operating mode.

With the development of expandable high-speed serial buses such as USB (universal serial bus), system designers have chosen to make it possible for keyboards and other human interface devices to be connected to the computer by means of such buses. FIG. 2 is a functional block diagram of a prior-art keyboard 30 and high-speed serial interface to a personal computer 11. The bus 32 may have any of a number of devices attached to it, each of which has a USB interface 31, 34. A USB interface 31 may permit attachment of a keyboard 30 or a pointing device 33.

The high-speed serial bus standards are not relatively simple and do require substantial computational overhead. As a consequence it has proven to be a fairly complicated issue to devise BIOS 25 which can handle human-interface device inputs such as keyboard scancodes and pointing device movements, and which can make them available to the operating system and applications programs 39.

FIG. 2 shows the operation of a keyboard and mouse connected to USB when the OS is running. The USB data from the keyboard 30 and rodent 33 are passed to the USB interface 34 and thence to the operating system 39.

Figure 3:
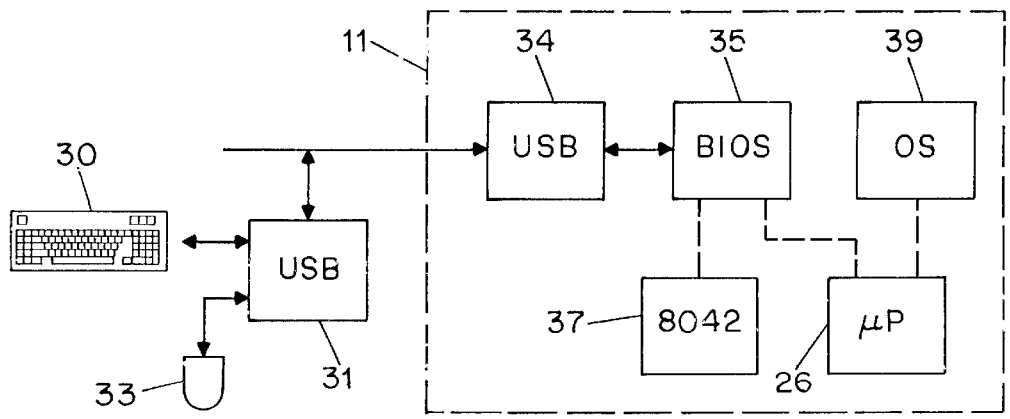
FIG. 3 is a functional block diagram of a prior-art keyboard and high-speed serial interface to a personal computer in a "boot" mode.

In contrast, FIG. 3 shows the operation during boot mode. Before the OS 39 is loaded, BIOS 34 looks for USB HID devices and will enumerate the first keyboard and mouse it finds. Then in current implementations it will emulate keyboard and mouse input as if it were coming through an 8042 interface. The console, and non-USB supporting OS are tricked this way to believe that a PS/2 type of keyboard is connected and they know how to handle input from an 8042 interface. In this way, even when there is some USB driver or HID driver problem. In this way we say that the BIOS 34 and associated hardware provides an emulated 8042 interface.

Figure 4:
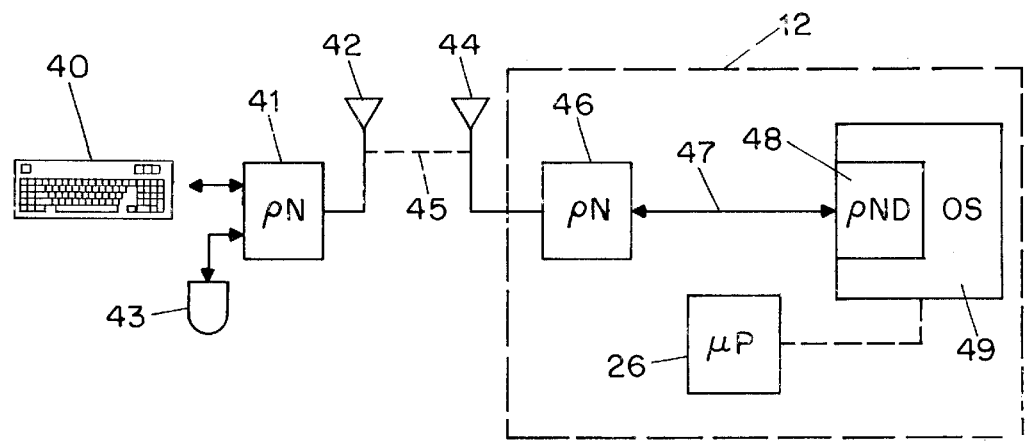
FIG. 4 is a functional block diagram of a prior-art keyboard and wireless interface to a personal computer.

FIG. 4 is a functional block diagram of a prior-art keyboard 40 and wireless interface to a personal computer 12. Antennas 42, 44 are connected with RF (radio frequency) circuitry 41, 46, often called "piconet" circuitry in the case where the wireless protocol used is Bluetooth. It should be appreciated, however, that the advantages of the invention are made available irrespective of the particular wireless protocol being used. Human interface devices such as keyboard 40 or mouse (or other pointing device) 43 connect with RF circuitry 41. Antennas 42, 44 are linked via radio link 45.

Figure 6:
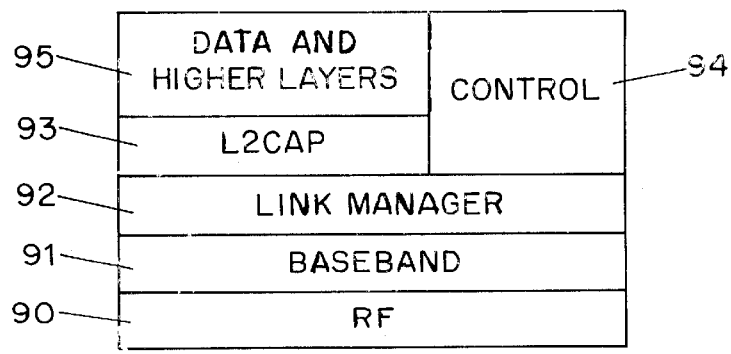
FIG. 6 is a protocol layer diagram for a wireless protocol usable in the system of FIG. 4.

A typical wireless protocol includes protocol layers as shown in FIG. 6. The lowest layer 90, corresponding to the ISO (International Standards Organization) physical layer, is the RF layer. The next layer 91 is the baseband layer. Above the baseband layer 91 is a link manager layer 92. Returning to FIG. 3, these layers are implemented in hardware and software such as hardware 46 and wireless driver 48.

Again referring to FIG. 4, as mentioned above, a substantial portion of the wireless protocol is implemented in a driver 48. This includes, in the case of Bluetooth, the Logical Link Control & Adaptation Protocol (L2CAP) layer 93 and control layer 94, as well as the Service Discovery Protocol and other data and higher layers shown generally at 95. This driver is installed into the operating system 49 when the RF circuitry 46 is installed. Microprocessor 26 is executing wireless driver 48, and operating system and application software 49. The hardware piconet controller 46 communicates with the rest of the system through a physical connection 47 that may be implemented through USB (which is the preferred interface) or a PCMCIA card interface, or through a high speed UART interface. Since USB supports plug-and-play device connectivity and high speed data rates, and as it has been implemented to every newly manufactured computer, it is the most common interface for the wireless piconet controller.

Importantly, close study of FIG. 4 brings the realization that in the event of a disk-drive or operating system crash, or corruption of the wireless driver 48, it becomes impossible to use the keyboard 40 or pointing device 43 to regain control of the computer 12. Even upon a forced physical reboot of the computer 12, if the driver 48 has been corrupted it will be impossible to control the computer by means of the keyboard 40.

Figure 5:
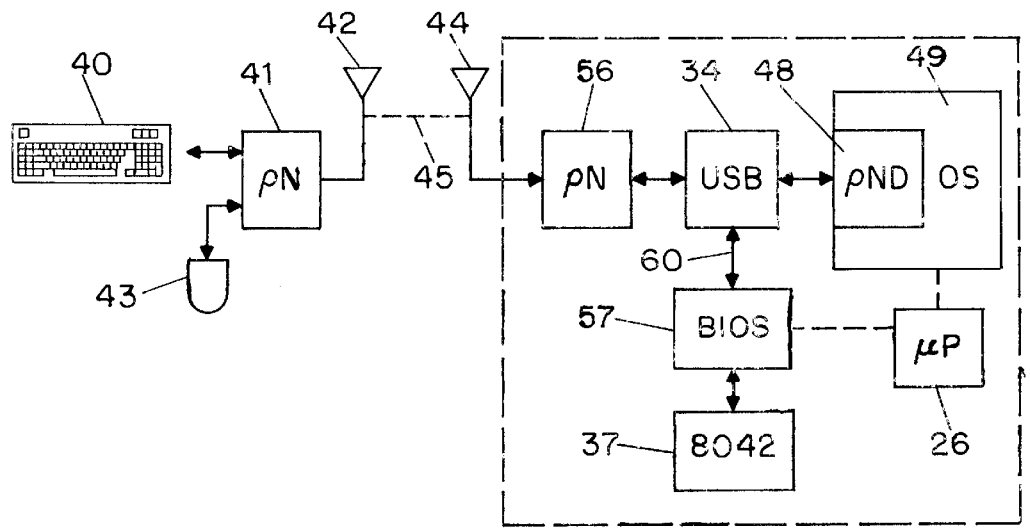
FIG. 5 is a functional block diagram of a wireless keyboard interface according to the invention.

In accordance with the invention, the above-mentioned problem is solved as shown in FIG. 5, which is a functional block diagram of a wireless keyboard interface. Keyboard 40, pointing device 43, RF interface 41, and antenna 42 may be as in the prior art shown in FIG. 4. RF link 45 and antenna 44 may likewise be as shown in FIG. 4. Assuming the driver 48 and operating system 49 are functioning normally, then a most convenient and versatile data path for human interface device data is through antenna 44, through RF interface 56, and through wireless driver 48. From there the data are available to the operating system or application software 49. Note that under normal operation the wireless link can accommodate different types of wireless devices besides keyboard and mice, that each can be served through common piconet drivers and higher layer software drivers that are specific to the device class involved.

Under any of a number of predetermined conditions, however, the system according to the invention handles human interface device data differently than was just described. Link 60 indicates the different handling, shown in FIG. 5 as a link from the USB 34 to the boot BIOS interface 57. Alternatively, depending on the particular design for the RF interface, the link 60 may connect from the RF hardware 56 to the BIOS 57. From there, the human interface device data pass through a virtual 8042 interface, just as in the system of FIG. 3, and are then available to the operating system or application program 49 without any requirement of a functioning wireless driver 48.

In one embodiment of the invention, the predetermined condition that triggers the alternative handling of human interface device data is the absence or corruption of the wireless driver 48. In a typical boot sequence the pN controller 56 will present itself to the USB interface as a boot keyboard and mouse device. A USB-aware BIOS will set the USB device in "boot mode" by setting an appropriate control bit through the USB interface 34. Subsequently the pN controller 56 will present keyboard and mouse data following the boot report format described in the USB HID specification. When and if the OS along with the wireless drivers load they will reset the USB interface 34 and will interrogate each USB device for its descriptors. At this stage the device may elect to present itself as a generic wireless interface. Of course if the wireless driver fails to load no further transactions would be available. In another implementation the device may check positively for the presence of the wireless device driver. For example, the RF hardware and firmware may from time to time send a scancode indicative of one of the "lock" keys having been pressed and released, watching carefully for the response which would be expected if the wireless driver 48 is intact and functioning normally. A different response, or absence of a response, may be interpreted as the condition that prompts handling of human interface device data through the USB port and virtual 8042 37. Other methods may likewise be devised for testing the presence and apparent good health of the wireless driver 48, such as a query for the software version level of the driver 48. In this way, computer 13 may still be controlled by a keyboard 40 in a very robust way, even in the event that the driver 48 is missing or corrupted.

In another embodiment of the invention, the predetermined condition that triggers the alternative handling of human interface device data is the entry of an escape sequence by a user at the keyboard 40. This escape sequence may be a keystoke or combination of keystrokes that has particular meaning in the context of a particular operating system, such as the "escape" key, control-alt-delete, or control-C or control-Z. Detection of such keystrokes by RF interface 56 can prompt the alternative handling. This alternative handling may apply only to the particular escape sequence, or may cause all subsequent data to be passed through the alternative data path 57, 37.

It should be appreciated that while the invention is shown in a system where human interface device inputs have, as their backup data path, a universal serial bus connection, the invention is not so limited. For example, the backup data path could be the older serial data path shown in FIG. 1, or could be some other data path that does not require a wireless driver 48 for its function.

It will be appreciated that the arrangement of FIG. 5 provides a particularly easy way to employ a wireless keyboard 40 and interface 41 (FIGS. 4 or 5) in connection with a prior-art computer 11 as shown in FIG. 2. The computer 11 of FIG. 2 is used along with a properly designed RF interface 64 and antenna 44, and with an appropriate wireless driver 48. The bus interface 65 and BIOS 69 may be the same as the bus interface 34 of FIG. 2. In this way, the user need only plug a wireless interface 64 (with antenna 44) into the USB port of a prior-art USB-equipped computer 11, and the wireless keyboard 40 may immediately be put to use even if the wireless driver 48 has not yet been installed. When the wireless driver 48 is installed, then the system offers the many wireless benefits that follow upon installation of the wireless system.

The approaches just described permit a robust and reliable human interface device connection to the computer via a wireless protocol and yet provide the reliability of a conventional wired interface.

Those skilled in the art will have no difficulty devising myriad obvious variations and improvements of the embodiments shown here, all of which are to be encompassed within the claims which follow.

What is claimed is:

1. A method for use with a computer having a BIOS, an operating system, a wireless host, a serial bus interface coupled with the BIOS, the wireless host operating under a protocol that functions only in the presence of a corresponding wireless communications driver in the operating system, the BIOS characterized in that keyboard information received via the serial bus interface is made available to the operating system by means other than the wireless communications driver, the method comprising the steps of:

receiving first keyboard information via the wireless host;

passing the first keyboard information to a wireless communications driver in the operating system;

making the first keyboard information available to the operating system;

testing for presence of the wireless communications driver in the operating system and finding the wireless communications driver to be absent;

receiving second keyboard information via the wireless host;

passing the second keyboard information to the serial bus interface;

making the second keyboard information available to the operating system by means other than the wireless communications driver.

2. The method of claim 1 wherein the wireless host and wireless communications driver operate according to a Bluetooth protocol, and wherein the serial bus interface operates according to the Universal Serial Bus protocol.

3. A wireless host apparatus for use with a computer having a BIOS, an operating system, a serial bus interface coupled with the BIOS, the wireless host operating under a protocol that functions only in the presence of a corresponding wireless communications driver in the operating system, the BIOS characterized in that keyboard information received via the serial bus interface is made available to the operating system by means other than the wireless communications driver, the host apparatus comprising:

a receiving antenna;

first means for testing for presence of the wireless communications driver in the operating system;

second means operatively coupled with the first means for responding to receipt of keyboard information via the receiving antenna by passing the received keyboard information to the wireless communications driver if the wireless communications driver is present, and by passing the received keyboard information via the serial bus interface to the operating system by means other than the wireless communications driver, the means operatively coupled with the second means, if the wireless communications driver is not present.

4. The apparatus of claim 3 wherein the wireless host and wireless communications driver operate according to a Bluetooth protocol, and wherein the serial bus interface operates according to the Universal Serial Bus protocol.

5. The apparatus of claim 3 wherein the host apparatus is connected with the computer solely through the serial bus interface.

6. A method for use with a computer having a BIOS, an operating system, a wireless host, a serial bus interface coupled with the BIOS, the wireless host operating under a protocol that functions only in the presence of a corresponding wireless communications driver in the operating system, the BIOS characterized in that keyboard information received via the serial bus interface is made available to the operating system by means other than the wireless communications driver, the method comprising the steps of:

testing for presence of the wireless communications driver in the operating system and finding the wireless communications driver to be absent;

receiving first keyboard information via the wireless host;

passing the first keyboard information to the serial bus interface;

making the first keyboard information available to the operating system by means other than the wireless communications driver.

7. The method of claim 6 wherein the wireless host and wireless communications driver operate according to a Bluetooth protocol, and wherein the serial bus interface operates according to the Universal Serial Bus protocol.

8. The method of claim 6 comprising the additional step, performed between the receiving step and the passing step, of determining that the first keyboard information is indicative of an escape sequence.

9. The method of claim 8 wherein the escape sequence is control-alt-delete.

10. A method for use with a computer having a BIOS, an operating system, a wireless host, a serial bus interface coupled with the BIOS, the wireless host operating under a protocol that functions only in the presence of a corresponding wireless communications driver in the operating system, the BIOS characterized in that keyboard information received via the serial bus interface is made available to the operating system by means other than the wireless communications driver, the method comprising the steps of:

receiving first keyboard information via the wireless host;

determining that the first keyboard information is indicative of an escape sequence;

passing the first keyboard information to the serial bus interface;

making the first keyboard information available to the operating system by means other than the wireless communications driver.

11. The method of claim 10 wherein the wireless host and wireless communications driver operate according to a Bluetooth protocol, and wherein the serial bus interface operates according to the Universal Serial Bus protocol.

12. The method of claim 10 wherein the escape sequence is control-alt-delete.

13. A wireless host apparatus for use with a computer having a BIOS, an operating system, a serial bus interface coupled with the BIOS, the wireless host operating under a protocol that functions only in the presence of a corresponding wireless communications driver in the operating system, the BIOS characterized in that keyboard information received via the serial bus interface is made available to the operating system by means other than the wireless communications driver, the host apparatus comprising:

a receiving antenna;

first means for receiving keyboard information via the receiving antenna and for determining whether the received keyboard information is indicative of an escape sequence;

second means operatively coupled with the first means for responding to the receipt of the received keyboard information by passing the received keyboard information to the wireless communications driver if the received keyboard information is indicative of an escape sequence, and by passing the received keyboard information via the serial bus interface to the operating system by means other than the wireless communications driver, the means operatively coupled with the second means, if the received keyboard information is not indicative of an escape sequence.

14. A method for use in a computer system comprising a serial bus, a keyboard generating scancodes, a BIOS, an emulated 8042 interface, and an operating system; the method comprising the steps of:

connecting a wireless interface to the serial bus;

wirelessly coupling the keyboard to the wireless interface;

interrogating the serial bus and identifying the keyboard, the interrogation and identification mediated by the wireless coupling;

setting a flag within the keyboard indicative of the keyboard being in communication with the BIOS;

receiving scancodes from the keyboard by means of the wireless coupling and the serial bus; and presenting the scancodes to the operating system by means of the emulated 8042 interface.

15. A wireless interface apparatus for use with a computer comprising a serial bus, a BIOS, and an emulated 8042 interface, and connected with the computer by means of the serial bus, the wireless interface apparatus also for use with a wirelessly coupled keyboard, the wireless interface apparatus comprising:

first means responsive to an interrogation of the serial bus by the computer for setting a flag, internal to the wireless interface apparatus, indicative of communication with the BIOS; and second means operatively coupled with the first means and responsive to the condition of the flag being set, for receiving keyboard information from the keyboard and providing the information to the serial bus in a format causing the BIOS to provide the information to the computer through the emulated 8042 interface.

16. The apparatus of claim 15 wherein the wireless interface operates according to a Bluetooth protocol, and wherein the serial bus interface operates according to the Universal Serial Bus protocol.

17. A wireless interface apparatus for use with a computer comprising a serial bus, a BIOS, and an emulated 8042 interface, and connected with the computer by means of the serial bus, the wireless interface apparatus also for use with a wirelessly coupled keyboard, the wireless interface apparatus comprising:

first means responsive to receipt of an escape sequence from the keyboard for setting a flag, internal to the wireless interface apparatus, indicative of communication with the BIOS; and second means operatively coupled with the first means and responsive to the condition of the flag being set, for receiving keyboard information from the keyboard and providing the information to the serial bus in a format causing the BIOS to provide the information to the computer through the emulated 8042 interface.

18. The apparatus of claim 17 wherein the wireless interface operates according to a Bluetooth protocol, and wherein the serial bus interface operates according to the Universal Serial Bus protocol.

19. The apparatus of claim 17 wherein the escape sequence is control-alt-delete.

* * * * *

UNITED STATES PATENT AND TRADEMARK OFFICE
CERTIFICATE OF CORRECTION

PATENT NO. : 6,687,774 B2  Page 1 of 1
DATED : February 3, 2004
INVENTOR(S) : Ioannis Millios and Wei Wang It is certified that error appears in the above-identified patent and that said Letters Patent is hereby corrected as shown below:

<u>Title page,</u>
Item [54], Title, "-ROUSTNESS-" should read -- ROBUSTNESS --

Signed and Sealed this

Twenty-fifth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,687,774 B2
DATED : February 3, 2004
INVENTOR(S) : Ioannis Milios and Wei Wang It is certified that error appears in the above-identified patent and that said Letters Patent is hereby corrected as shown below:

<u>Title page,</u>
Item [54], Title, "-ROUSTNESS-" should read -- ROBUSTNESS --

This certificate supersedes Certificate of Correction issued May 25, 2004.

Signed and Sealed this

Fourteenth Day of June, 2005

JON W. DUDAS
*Director of the United States Patent and Trademark Office*